March 7, 1939.  B. G. LINDSTROM  2,149,812
METHOD OF DRYING BATTERY PLATES
Filed Dec. 28, 1931  4 Sheets-Sheet 1
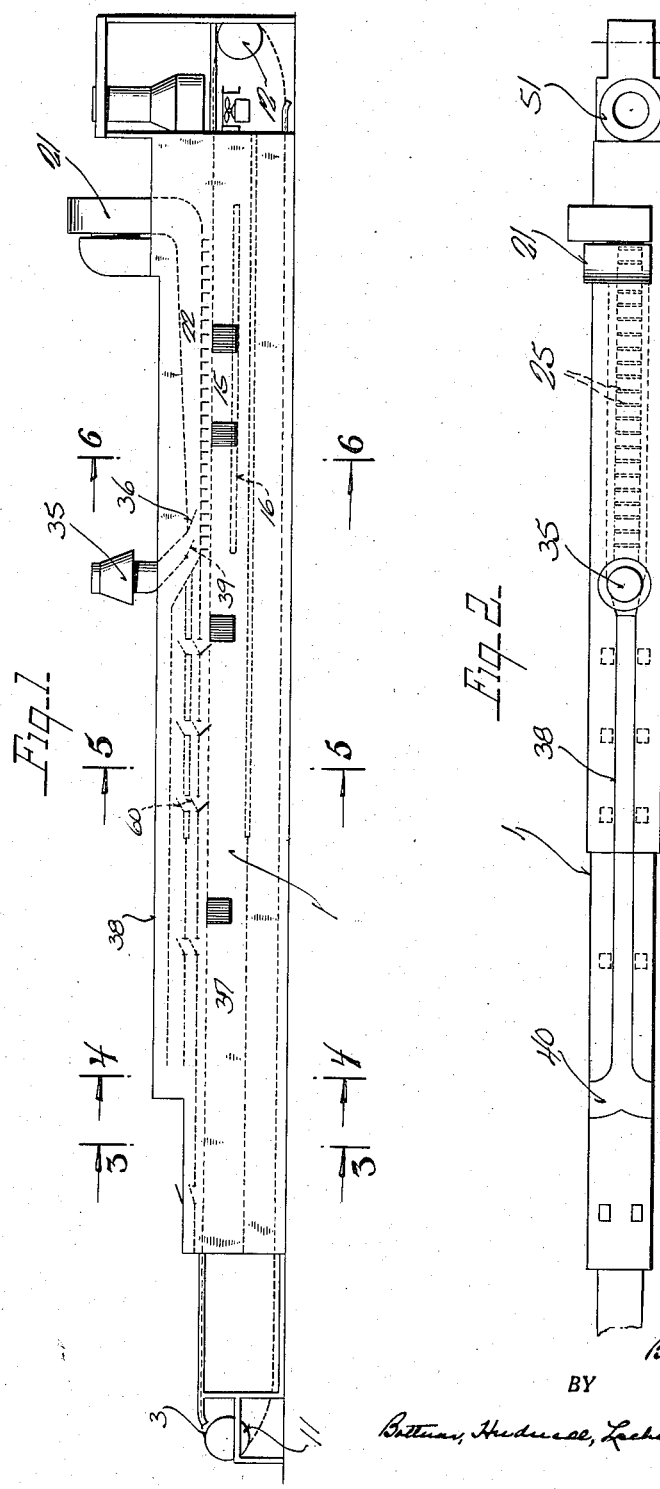
INVENTOR.
Bruce G. Lindstrom
BY
ATTORNEYS March 7, 1939.    B. G. LINDSTROM    2,149,812
METHOD OF DRYING BATTERY PLATES
Filed Dec. 28, 1931    4 Sheets-Sheet 2
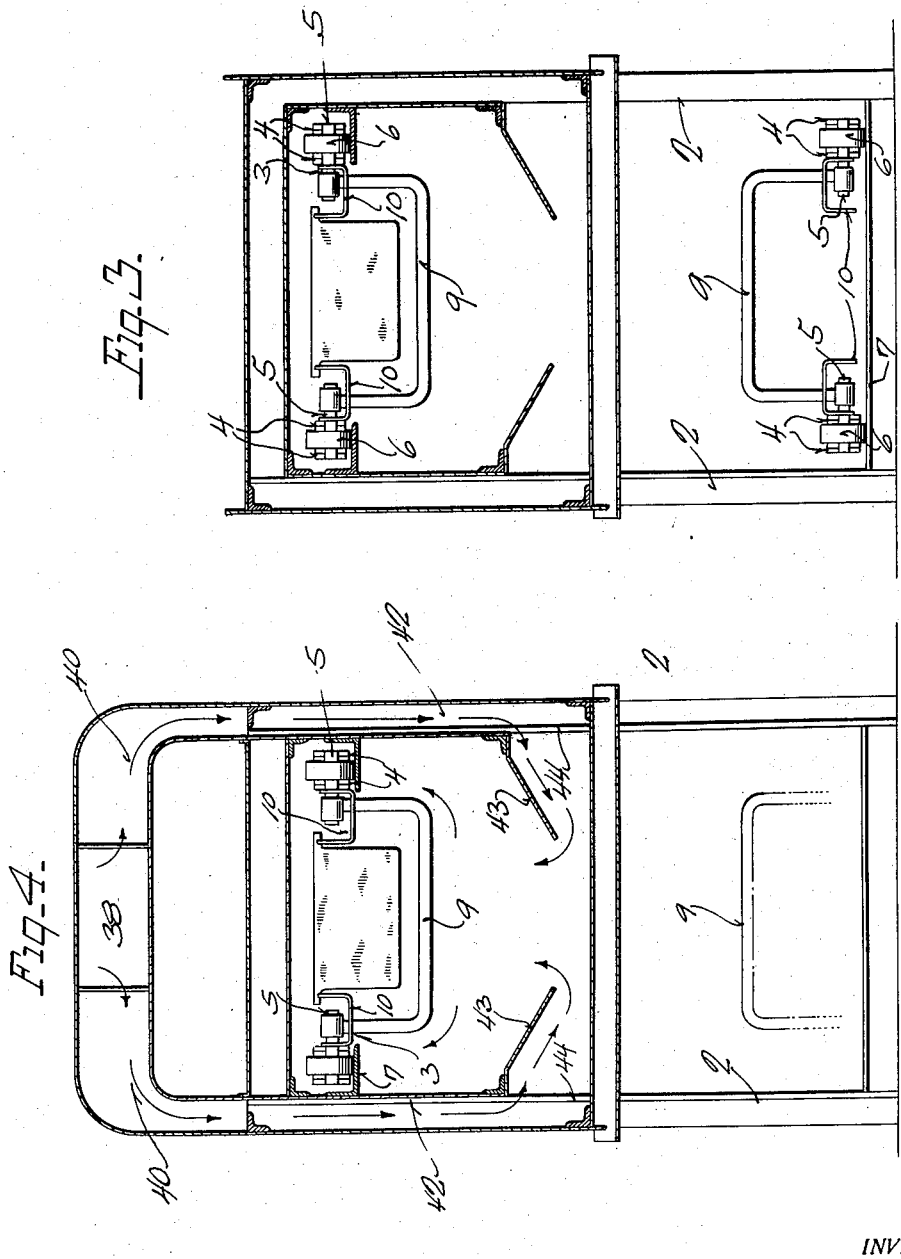
INVENTOR.
Bruce G. Lindstrom
BY
ATTORNEYS March 7, 1939.  B. G. LINDSTROM  2,149,812
METHOD OF DRYING BATTERY PLATES
Filed Dec. 28, 1931  4 Sheets-Sheet 3
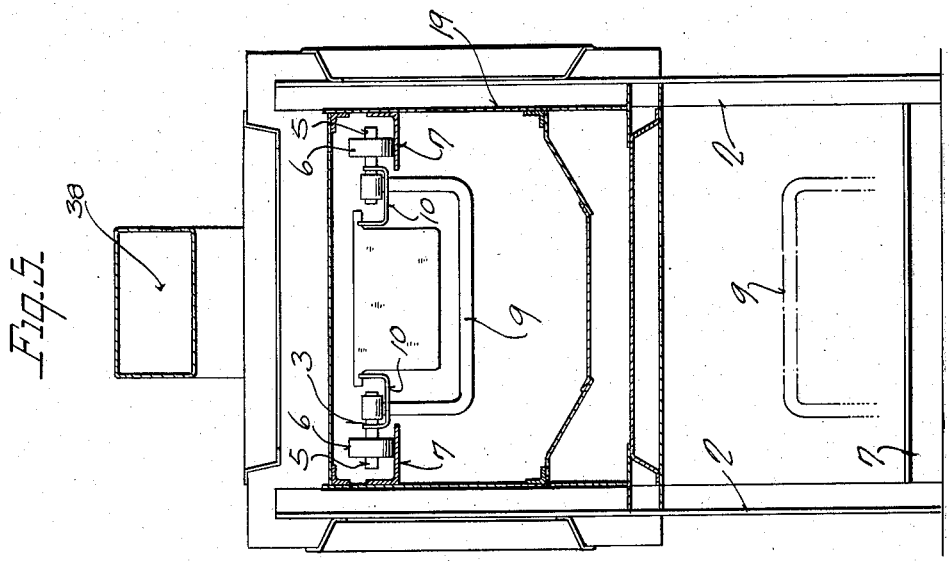
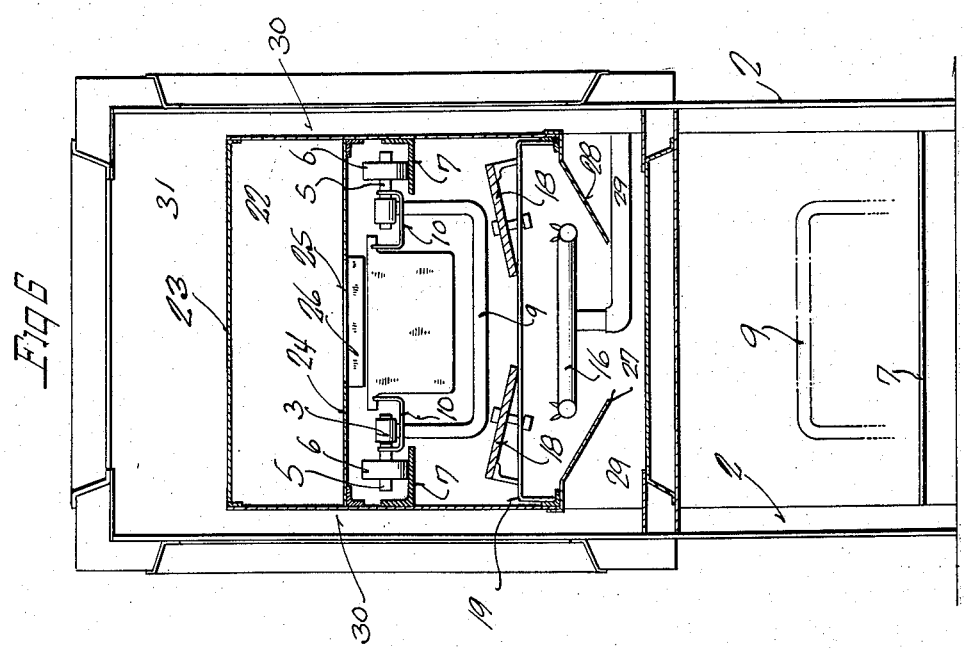
INVENTOR.
Bruce G. Lindstrom
BY
ATTORNEYS

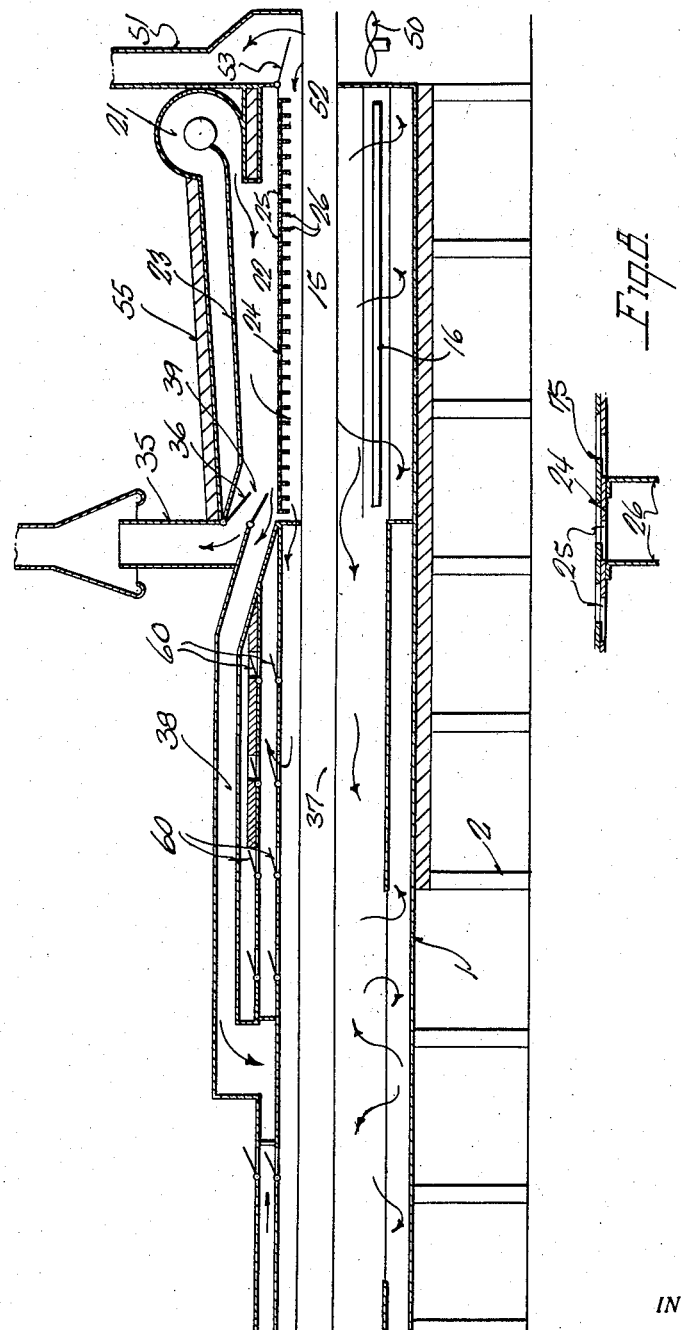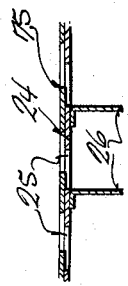

Patented Mar. 7, 1939

2,149,812

UNITED STATES PATENT OFFICE 2,149,812

METHOD OF DRYING BATTERY PLATES

Bruce Gustaf Lindstrom, Milwaukee, Wis., assignor, by mesne assignments, to Globe-Union Inc., Milwaukee, Wis., a corporation of Delaware Application December 28, 1931, Serial No. 583,453

2 Claims. (Cl. 136—33)

This invention relates to a method of drying freshly pasted battery plates.

Various methods for drying storage battery plates have been used but with the exception of drying by means of dry steam under high pressure they are generally rather slow processes requiring several hours to produce a dry plate capable of standing up under the handling and other operations incidental to their assembly in a battery. Great difficulty has been encountered in producing a dry battery plate which is free from checks or cracks and has the proper hardness and other desirable qualities.

An object of the present invention is to provide a method of drying a battery plate which carries out the operation in a rather short time, the drying period requiring from about one-half to not more than one hour and which produces a plate free from checks and cracks and with a hard surface practically free from surface dust.

In carrying out the present invention, the plates in the first stage of the treatment are first brought up to the proper temperature for curing or setting of the paste in an atmosphere highly charged with $CO_2$ gas. In the second stage, this temperature is maintained within certain limits until the chemical reactions involved in the setting or curing are completed. This second stage of the treatment is also carried out in an atmosphere highly charged with $CO_2$ gas. Finally, after the plate material or paste is properly set, the plate is subjected to a somewhat higher temperature and consequently is dried very rapidly and this without damage done to the structure of the active material. In this final stage, the plates are also subjected to the high temperature in an atmosphere of $CO_2$ gas.

It has been found that the $CO_2$ gas accelerates the drying and it is believed that it accomplishes this purpose by facilitating the release of moisture from the material of the plates while inhibiting surface drying. It is further thought that the $CO_2$ gas combines with the active material of the plates to form a lead carbonate—probably in a basic form. The net result of the dehydration under the influence of heat and $CO_2$ gas is the formation of a fine and dense crystalline material of uniform structure in the active material of the plates. There are practically no large crystals nor the undesirable varying crystal structures present such as will be found in the paste of a battery plate dried in an atmosphere free from any $CO_2$ gas except such small amounts as may be contained in the air. Where the crystalline structure varies, there is greater opportunity for cleavage and the material of the plates has an inherent tendency to check or crack.

An oven suitable for carrying out the method of the present invention consists essentially of a casing or housing or some equivalent structure affording a preliminary heating chamber or zone in which the plates are brought up to a setting or curing temperature, a curing or setting chamber or zone in which the plates are maintained at the proper temperature under appropriate conditions of relative humidity to cause the paste material to set without excessive drying and a final drying chamber in which the plates are dried very rapidly in an atmosphere of relatively high humidity to prevent surface drying and consequent checking of the paste material. Appropriate conditions of temperature and humidity may be set up and maintained by providing a set of burners in the final drying chamber to supply heat and $CO_2$ gas. A fan or blower is organized with the final drying chamber to re-circulate the $CO_2$ gas and moisture therethrough and to circulate portions of such gases and vapors through the other chamber or zones of the oven. Preferably certain portions of said gases and vapors are bypassed from the discharge or delivery duct of the fan or blower to the setting or curing chamber or zone. Maintenance of appropriate conditions of humidity also requires supply predetermined amounts of fresh air to the oven and the exhausting to the atmosphere of controlled amounts of gases and vapors from the chambers of the oven and from the discharge duct of the fan. Obviously the particular construction or design of an oven having these essential characteristics may be widely varied and hence the embodiment illustrated in the drawings and described hereinafter should be regarded merely as a somewhat diagrammatic illustration of one type of construction.

Other objects and advantages reside in certain novel features of the construction, arrangement and combination of parts which will be hereinafter more fully described and particularly pointed out in the appended claims, reference being had to the accompanying drawings, forming a part of this specification and showing an apparatus or oven embodying the present invention.

In the drawings:

Figure 1 is a view partly in side elevation and partly in section showing a drying oven embodying the present invention;

Figure 2 is a plan view of the structure shown in Figure 1;

Figures 3, 4, 5 and 6 are views in transverse vertical section taken on lines 3—3, 4—4, 5—5 and 6—6, respectively, of Figure 1;

Figure 7 is a diagrammatic view showing the oven in longitudinal section; and

Figure 8 is a fragmentary view in section illustrating a damper employed between the delivery or discharge duct of the fan and the final drying chamber.

Referring to the drawings, it will be seen that the oven embodying the present invention consists of an elongated casing or housing designated generally at 1 and which is supported above the floor or ground level by legs or other supports 2. The casing or housing of the oven is of double wall construction to provide structure for conveniently defining the ducts and passages hereinafter described. The plates to be dried are carried through the oven from the left to the right as viewed in Figures 1 and 7 and for this purpose an endless conveyor designated generally at 3 may be provided. While the particular construction of the endless conveyor forms no part of the present invention and while various well known types and constructions of conveyors may be employed, the principal characteristics of the conveyor shown will be briefly and generally referred to. As shown, the conveyor 3 consists of a pair of endless chains or flexible elements 4, the links or sections of which are pivotally interconnected. At least certain of the links of each endless chain may have axles 5 mounted thereon and on which rollers or wheels 6 are rotatably supported. The rollers or wheels 6 ride on tracks 7 provided therefor, the tracks extending through the oven and also beneath the oven. The chains 4 are constrained to corresponding movement by means of connecting yokes 9 which are connected to the axles 5 in between the hangers or supporting brackets 10 suitably fastened to the links of the chains 4 and providing a means whereby the plates to be dried may be conveniently supported on the endless conveyor. The chains 4 are trained about driving and idler sprockets designated at 11 and 12.

In the final drying chamber of the oven which is designated at 15, a burner 16 is provided, the burner being located in the lower portion of the chamber and serving as a source of supply of heat and $CO_2$ gas.

The burners 16 are located in the lower part of the final drying chamber and just above these burners inclined deflector plates 18 are provided, the deflector plates being interposed between the burners and the path of travel of the battery plates to be dried and being supported on cross members 19 incorporated in the oven structure.

For circulating the moist air and $CO_2$ gas through the various chambers or zones of the oven, a fan or blower designated at 21 is provided. The fan 21 discharges into a discharge or delivery duct or conduit 22 located above the final drying chamber 15 and defined by portions of the inner side walls of the oven and by partitions 23 and 24, as will be understood from a comparison of Figures 1, 6 and 7. The partition 24 which defines the lower wall of the discharge or delivery duct is slotted as at 25 and adjacent each slot portions of the partition are bent downwardly to provide deflectors 26. With this construction a major portion at least of the gas delivered by the fan or blower to the discharge duct 22 flow downwardly through the slots 25 into the final drying chamber 15. Some portion at least of the gases thus delivered to the final drying chamber 15 pass downwardly through the chamber and out through an opening 27 formed between baffles 28 defining the bottom of the drying chamber 15. These baffles 28 are located slightly above the bottom wall of the oven so that the gases that pass out through the openings 27 flow through spaces 29 to conduits or ducts 30 communicating with the spaces 29 and formed between the outer and inner walls of the oven. The conduits 30 extend vertically of the oven and at their upper end communicate with a return duct or passage 31 defined between the top wall of the oven and the partition 23 and leading back to the suction side of the fan or blower 21 (see Figure 6). Within the final drying chamber 15 some portion at least of the gases delivered thereto through the slots 25 are re-circulated, that is, they pass down between the deflectors 18, then outwardly between these deflectors and the baffles 27, upwardly through the final drying chamber 15, across the battery plates passing therethrough and then again downwardly through the central portion of the final drying chamber. The gases thus being re-circulated are continually commingling with the gases passing directly through the final drying chamber and back to the suction side of the fan. Thus, the gases which are circulated or re-circulated in the final drying chamber are continually being refreshed.

It is to be understood that a substantial portion of the gases and vapors delivered through the slots 25 into the final drying chamber pass axially from the final drying chamber and into other chambers or zones of the oven, and, of course, in a direction opposite to the direction of movement of the plates. In other words, the main flow of gases and vapors is axially through the oven from the right to the left as viewed in Figures 1 and 7.

While portions of the gases and vapors delivered to the discharge duct 22 flow thrugh the slots 25 and into the final drying chamber, other portions thereof are either exhausted to the atmosphere or bypassed to the setting or curing zone of the oven. For these purposes a stack or flue 35 is provided and communicates with the discharge duct 22 under the control of a damper 36. When the damper 36 is opened, a substantial portion of the gases and vapors delivered to the duct 22 are vented or exhausted through the stack 35 to the atmosphere. The amount so exhausted may be cut down by appropriately adjusting the damper and of course by closing the damper 36 the escape of gases through the stack 35 may be entirely cut off. Between the discharge duct 22 and one end of the curing or setting chamber or zone 37 a bypass 38 is provided, the bypass communicating with the discharge duct under the control of a damper 39 and having branches 40 at its other end communicating with passages 42 defined between the side walls of the oven and communicating at their lower ends with the interior of the oven at the setting or curing zone thereof (see Figure 4). Baffles 43 may be provided adjacent the openings 44 in the inner walls of the oven, which openings afford communications between the passages 42 and the setting or curing zone.

A controlled amount of fresh air may be supplied to the oven by means of a motor driven fan 50, the blast from which is directed up a stack 51 or into the opening 52 of the oven under the control of the combined damper and deflector 53. The portion of the oven which provides the curing or setting chamber and the final drying chamber is preferably covered by heat insulating material designated at 55.

In operation, the fan 21 moves the drying medium at a fairly good velocity (from 2000 to 5000 cubic feet per minute with an oven of the capacity of the one shown), the air moving at this velocity into the duct 22 from whence portions pass through the slots 25 to the final drying chamber and pass the dampers 36 and 39 into the stack 35 and bypass 38, the amount of gases traveling out through the stack 35 or through the bypass 38, depending upon the adjustment of the dampers 36 and 39. The portion of the gas which passes into the final drying chamber is enriched by the products of combustion and consequently highly charged with $CO_2$ gas and such portion of the gas is either recirculated in the final drying chamber, advanced axially through the oven from right to left as viewed in Figure 1 or returned to the fan 21 for recirculation. In any event, portions of the gases, rich in moisture, and $CO_2$ gas are delivered to the inlet end of the oven and such gases serve to bring the battery plates to the desired temperature.

By providing the ventilators or damper controlled vents 60 at appropriate points along the oven, a relative humidity may be maintained within the desired limits. This control of humidity conditions is aided by the provision of the combined damper and deflector 53 and the fan 50.

The temperature in the preheating and curling sections is kept between 120° F. and 140° F., preferably about 125° F. The temperature in the final drying chamber is kept in the neighborhood of 350° F. It is to be understood that these temperatures are varied according to the drying time and also according to the thickness and moisture content of the battery plates to be dried. While the freshly pasted plate is being brought up to the desired temperature in the first drying stage, the actual drying of the plate is retarded to a minimum by maintaining a very relatively high humidity. In the second drying stage the moisture is drawn out of the plate at a very rapid rate while still maintaining a rather high humidity around the plate, whereby to prevent surface drying with consequent checking of the material. The vapor pressure differential between the actual vapor pressure of the moisture and the theoretical vapor pressure for the prevailing temperature should not exceed 30 millimeters of mercury or thereabout. This would correspond to a relative humidity varying from 79% at 120° F. to 91.7% at 160° F. The $CO_2$ gas not only accelerates the drying but it is thought, also combines with the active material of the plates to form a lead carbonate—probably in a basic form.

Flow of the gases axially through the oven, that is, from the right to the left as viewed in Figure 7, may be regulated and controlled to some extent by utilizing a slide damper 75 for at least certain of the slots 25. As illustrated in Figure 8, the damper 75 may be adjusted to overlap at least certain of the slots 25 to a varying degree or entirely. By blocking off certain of these slots 25 flow of gas and vapor downwardly therethrough is prevented at the outlet end of the final drying chamber. As a consequence the resistance to the axial flow of the gases through the oven is decreased.

The invention claimed is:

1. The method of treating freshly pasted plates for storage batteries of the Faure lead-acid type preliminary to the drying of the paste, which comprises forming on the surfaces only of the plates a layer of carbonate of lead in sufficient amount to prevent material cracking of the paste while being dried.

2. The method of treating freshly pasted plates for storage batteries of the Faure lead-acid type for a final drying operation which comprises subjecting the freshly pasted plates to the action of carbon dioxide in sufficient concentration to cause the carbon dioxide to react with the material of the plates and form lead carbonate at least at the surfaces of the plates whereby the plates, when finally dried, are, due to the presence of the lead carbonate during the final drying operation, hard, shock resistant and free from checking and surface dust.

BRUCE GUSTAF LINDSTROM.